United States Patent
Vasa et al.

(10) Patent No.: US 6,324,396 B1
(45) Date of Patent: Nov. 27, 2001

(54) CALLING PARTY NUMBER PROVISIONING

(75) Inventors: Suzy Vasa, Garland; Kendra Plessy, Plano; Sridhar Karuturi, Dallas, all of TX (US); Robin Joseph, Wicklow (IE); Anders Lindgren, Rönninge (SE)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/185,980

(22) Filed: Nov. 4, 1998

(51) Int. Cl.$^7$ .................................................. H04M 3/42
(52) U.S. Cl. ........................ 455/415; 455/432; 379/142
(58) Field of Search .............................. 455/414, 415, 455/422, 432, 433, 435, 445, 458; 379/141, 142, 229, 230, 245, 247

(56) References Cited

U.S. PATENT DOCUMENTS

| | | | |
|---|---|---|---|
| 5,274,699 | * 12/1993 | Ranz | 379/142 |
| 5,497,414 | * 3/1996 | Bartholomew | 379/142 |
| 5,533,106 | * 7/1996 | Blumhardt | 379/142 |
| 5,812,649 | * 9/1998 | Shen | 455/415 |
| 5,839,072 | * 11/1998 | Chien | 455/445 |
| 5,943,619 | * 8/1999 | Coyne et al. | 455/433 |
| 5,970,128 | * 10/1999 | Kim | 379/142 |
| 6,038,445 | * 3/2000 | Alperovich et al. | 455/422 |
| 6,061,560 | * 5/2000 | Saboorian et al. | 455/415 |
| 6,091,949 | * 7/2000 | Sanchez | 455/417 |
| 6,097,963 | * 8/2000 | Boltz et al. | 455/518 |
| 6,101,382 | * 8/2000 | Granberg | 455/414 |

\* cited by examiner

Primary Examiner—Nay Maung
Assistant Examiner—Quochien B. Vuong
(74) Attorney, Agent, or Firm—Jenkens & Gilchrist P.C.

(57) ABSTRACT

A system, method, and apparatus are provided for sending a calling party number for a roaming mobile station to a called party. The roaming mobile station subscriber dials an abbreviated number, corresponding to a full directory phone number, which is received by a visited public land mobile network (V-PLMN). The V-PLMN queries a service control point (SCP) to determine routing instructions corresponding to the abbreviated number. During the query, the SCP stores the calling party number in a register. The SCP transmits the routing instructions appended with an index and an identification number for the SCP. The V-PLMN uses the route instructions to route the call generated by the mobile station to a switching point serving the called party. The switching point then uses the index to retrieve the stored called party number from the SCP.

25 Claims, 3 Drawing Sheets

CALLING PARTY NUMBER PROVISIONING

BACKGROUND OF THE INVENTION

1. Technical Field of the Invention

The present invention relates generally to routing requests in a wireless network, and more particularly to a procedure for providing the calling party number of roaming subscribers.

2. Description of Related Art

In addition to offering telephonic services, most Public Land Mobile Networks (PLMNs) offer a variety of other communication services. For example, voice mail is a service whereby any party can leave a recorded voice message for the subscriber which is stored at a voice mail center. The voice mail center is usually connected as an Intelligent Peripheral (IP) to the PLMN and is accessible by establishing a phone call to a specific directory phone number associated with the voice mail center. A party can leave a voice message for a subscriber by calling the specific directory phone number, or more commonly, be forwarded to the voice mail center when calling the subscriber's phone number. The subscriber retrieves the message by establishing a call to the voice mail center using the directory phone number. Other examples of communication services include fax mail, and customer service, which are usually connected as IPs with associated directory phone numbers to the PLMN and accessible by establishing a phone call to the directory phone number.

Some IPs require the subscriber to identify themselves and provide a password/personal identification number after establishing a call to the IP. For example, voice mail often requires the subscriber to dial the subscriber's directory phone number and a password/PIN after connecting to voice mail in order to access their messages. The foregoing is often cumbersome and tedious for the subscriber.

To alleviate this problem, many IPs automatically identify the subscriber where the mobile station belonging to the subscriber is used to access the IP, thereby allowing the subscriber to bypass the identification procedure. The foregoing is accomplished at the IP by comparing the phone number of the calling party to the directory phone number of the subscriber's mobile station. The IP determines the phone number of the calling party by examining a parameter known as the calling party number, or the "A-number". During a phone call between a calling party and a called party, a packet of information is sent to the called party. The packet of information includes technical information related to the connection and routing of the incoming phone call. One of the parameters which is optionally included in the packet of information is the calling party number. The calling party number parameter identifies the phone number of the party making the outgoing phone call. The IP uses the calling party number to determine the phone number of the calling party, and where that number is the phone number of the subscriber's mobile station, the subscriber is automatically identified.

As an additional convenience to the subscriber, the subscriber is able to dial an abbreviated number, e.g. "133", to access a particular service. The abbreviated number is translated by a serving Mobile Switching Center (MSC) to generate the directory phone number for the IP providing the particular service. The directory phone number is used as the called phone number, thereby establishing access to the particular services for the subscriber.

The key advantage of subscribing to a PLMN is the mobility of the communications services. A subscriber subscribing to a PLMN can make a phone call from anywhere within the geographic area of the PLMN. The geographic area covered by a PLMN generally covers the metropolitan area of a large city or even a sizeable portion of a state or province, thereby permitting the subscriber a substantial degree of mobility. However, a subscriber traveling to a different country is frequently beyond the range of the PLMN that the subscriber subscribes to. To provide service to the subscriber, the operators of a PLMN serving the geographic area where the subscriber is located (now referred to as the Visitor PLMN—V-PLMN) permit the subscriber to use the resources and infrastructure of the V-PLMN. The foregoing is known in the art as roaming.

Because the servicing MSC in the V-PLMN is operated by a different party and not associated with the IPs of the PLMN to which the subscriber subscribes (now referred to as the Home PLMN—H-PLMN), it is unlikely that the serving MSC in the V-PLMN is able to translate the abbreviated number received from the mobile station into the directory phone number to complete a call to an IP. Instead, the subscriber must dial the full directory phone number to access or call an IP. The foregoing is particularly cumbersome if the subscriber is in a different country where an international dialing prefix and a country code must be dialed in addition to the directory phone number.

Additionally, because the calling party number is not necessary to complete a phone call, some V-PLMNs do not include the calling party number in the packet of information that is sent to the called party for roaming subscribers. As a result, a roaming subscriber accessing services from an IP is unable to take advantage of automatic identification. Therefore, even where the subscriber uses their mobile station to access the IP, the subscriber must still go through the identification procedure to access the services. Accordingly, it would be advantageous if the calling party number is provided to the IP.

It is therefore an object of the present invention to simplify a subscriber's access to IPs.

SUMMARY OF THE INVENTION

The present invention is directed to a system, method, and apparatus for providing a calling party number for a mobile station in a visited public land mobile network (V-PLMN) to a called party by receiving a request from the mobile station to establish an outgoing phone call, transmitting the calling party number to a service control point (SCP), storing the calling party number at the SCP, routing the outgoing phone call to the H-PLMN serving the called party, transmitting the calling party number from the SCP to the H-PLMN and forwarding the calling party number to the called party.

BRIEF DESCRIPTION OF THE DRAWINGS

A more complete understanding of the system, method, and apparatus of the present invention may be acquired by reference to the following Detailed Description when taken in conjunction with the accompanying Drawings wherein.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
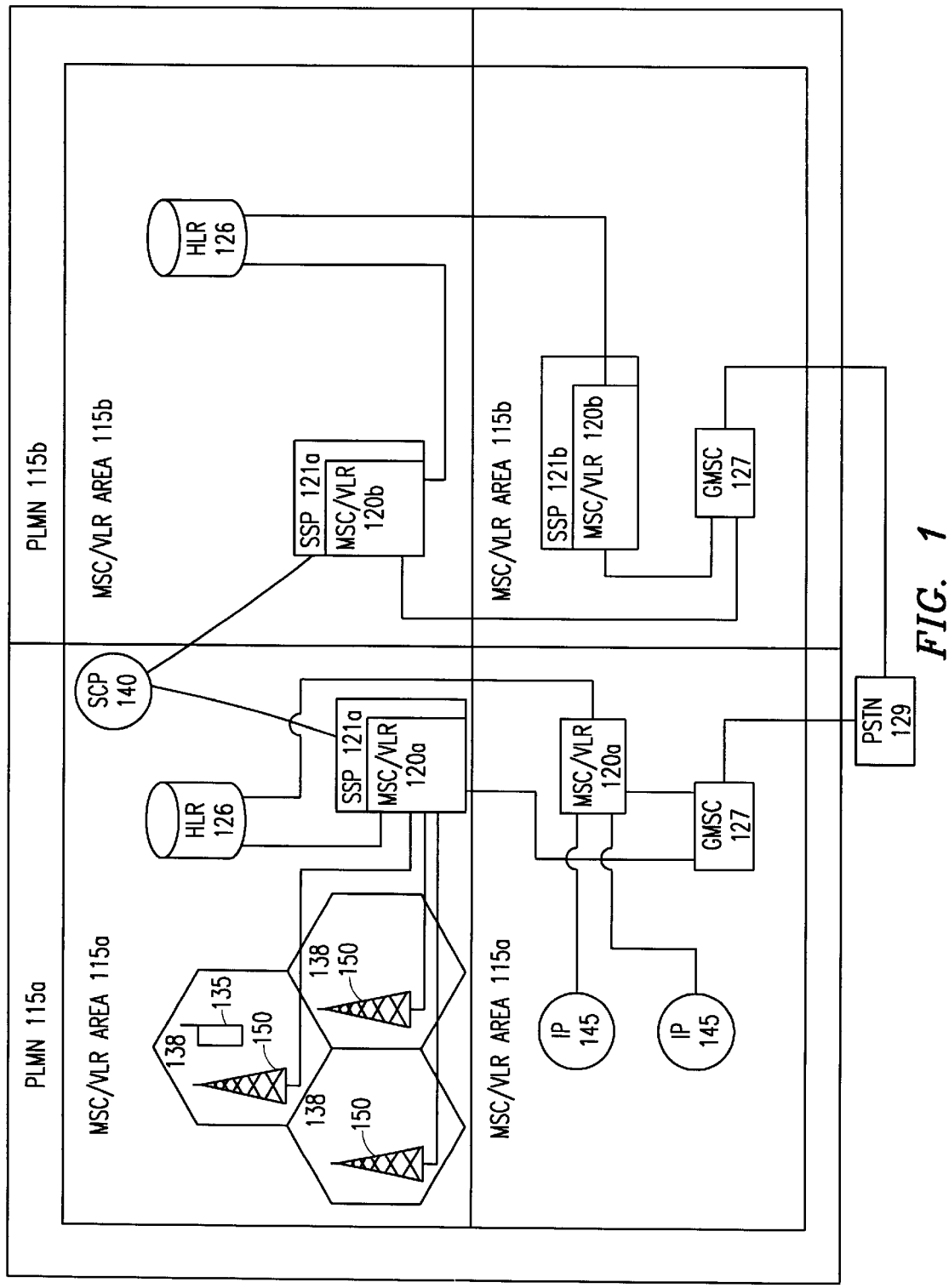
FIG. 1 is a block diagram of a plurality exemplary wireless networks within which the principles of the present invention may be supplement.

Reference is now made to FIG. 1 wherein there are shown a plurality of exemplary wireless networks, such as a Public Land Mobile Network (PLMN) 105, e.g., PLMNs 105a, 105b. The particular PLMN 105 utilized may include, for example, an Advanced Mobile Phone Service (AMPS) network, a Digital Advanced Mobile Phone Service (D-AMPS) network, or a Global System for Mobile Communication (GSM). As is well understood in the art, a particular PLMN 105 is composed of a plurality of Mobile Switching Center/Visitor Location Register (MSC/VLR) areas 115, e.g., MSC/VLR areas 115a and 115b, each with a Mobile Switching Center/Visitor Location Register (MSC/VLR) 120, i.e., MSC/VLRs 120a and 120b, respectively. Each MSC 120 is connected to a Gateway MSC 127 which connects the PLMN 105 to a public switched telephone network (PSTN) 129.

An MSC/VLR area 115 is a defined area in which a mobile station (MS) (terminal) 135 may move freely without having to send location update information to the MSC/VLR 120 that controls that MSC/VLR area 115. Mobile Station (MS) 135 is the physical equipment, for example a car phone or other portable phone, used by mobile subscribers to communicate with the cellular network 105, each other, and users outside the subscribed network, both wireline and wireless. Each MSC/VLR Area 115 is divided into a number of cells 138. The MSC 120 is in communication with at least one base station 150. The base station 150 is the physical equipment, illustrated for simplicity as a radio tower, that provides radio coverage to the geographical part of the cell 138 for which it is responsible.

With further reference to FIG. 1, each PLMN 105 includes a Home Location Register (HLR) 126, e.g., HLR 126a in PLMN 105a and HLR 126b in PLMN 105b, which is a database maintaining and storing subscriber information such as subscriber profiles, current location information, International Mobile Subscriber Identity (IMSI) numbers, and other administrative information. The subscriber services associated with the mobile station 135 are defined in a subscriber profile that is stored in the HLR 126. The HLR 126 may be co-located with a given MSC/VLR 120, integrated with the MSC/VLR 120, or alternatively can service multiple MSC/VLRs 120, the latter of which is illustrated in FIG. 1.

The VLR portion of the MSC/VLR 120 is a database containing information about all of the MSs 135 currently located within the MSC/VLR area 115. If an MS 135 moves from MSC/VLR area 115a to a new MSC/VLR area, for example, area 115b, the MSC/VLR 120b in MSC/VLR area 115b will request data about that MS 135 from the HLR database 126 (simultaneously informing the HLR 126 about the current location of the MS 135), for example, HLR 126b. Accordingly, if the user of the MS 135 then wants to make a call, MSC/VLR 120b in MSC/VLR area 115b has access to the requisite service profile information without having to reinterrogate the HLR 126. In the previously described manner, the MSC/VLR and HLR databases 120 and 126, respectively, contain various subscriber information associated with a given MS 135.

The PLMNs 105a, 105b each have access to any number of database interfaces, known as a Service Control Point (SCP) 140, e.g., 140a, 140b. The SCP 140 acts as an interface to databases operated by the Public Switched Telephone Network. These databases are used to store information regarding subscriber services, call routing, calling card validation, and fraud protection. In accordance with Intelligent Network (IN) specifications, the MSC/VLRs 120a, 120b are integrated with Service Switching Points (SSPs) 121a, 121b which are able to conduct database queries through the SCP 140 for various operations.

In addition to offering telephonic services, most PLMNs offer a variety of other communication services. For example, voice mail is a service whereby any party can leave a recorded voice message for the subscriber which is stored at a voice mail center. The voice mail center, as illustrated in FIG. 1, can be connected as an Intelligent Peripheral (IP) 145 to the PLMN 105 and is accessible by establishing a phone call to a specific directory phone number associated with the voice mail center. In this manner, the party can leave a voice message for a subscriber by calling the specific directory phone number, or more commonly, be forwarded to the voice mail center when calling the subscriber's phone number. The subscriber retrieves the message by establishing a call to the voice mail center 145 using the directory phone number, as is well understood in the art. Other examples of communication services include fax mail, and customer service which can also be connected as IPs 145 with associated directory phone number to the PLMN 105.

Some IPs 145 require the subscriber to identify themselves and provide a password/personal identification number after making the connection to the IP. For example, voice mail often requires the subscriber to dial their directory phone number and a password/PIN after connecting to voice mail in order to access their messages. The foregoing is often cumbersome and tedious for the subscriber.

To alleviate this problem, many IPs 145 automatically identify the subscriber where the MS 135 belonging to the subscriber is used to access the IP 145, thereby allowing the subscriber to bypass the identification procedure. The foregoing is accomplished at the IP 145 by comparing the phone number of the calling party to the directory phone number of the subscriber's MS 135. The IP 145 determines the phone number of the calling party by examining a parameter known as the calling party number, or the "A-number". During a phone call between a calling party and a called party, a packet of information is sent to the called party. The packet of information includes technical information related to the connection and routing of the incoming phone call. One of the parameters which is optionally included in the packet of information is the calling party number. The calling party number parameter identifies the phone number of the party making the outgoing phone call. The IP 145 uses the calling party number to determine the phone number of the calling party, and where that number is the phone number of the subscriber's MS 135, the subscriber is automatically identified.

As an additional convenience to the subscriber, the subscriber is able to dial an abbreviated number, e.g. "133", to access a particular service. The abbreviated number is translated by the MSC/VLR 120 to generate directory phone number for the IP 145 providing the particular service. The directory phone number is used as the called phone number, thereby establishing access to the particular services for the subscriber.

The key advantage of subscribing to a cellular network, such as PLMN 105, is the mobility of the communication service. A subscriber subscribing to a PLMN, e.g., 105a, can make a phone call from anywhere within the geographic area of the PLMN 105a. The geographic area covered by a PLMN 105a generally covers the metropolitan area of a large city or even a sizeable portion of a state or province, thereby permitting the subscriber a substantial degree of mobility. However, subscribers traveling to a different country are frequently beyond the range of their PLMN 105a. To provide service to the subscriber, the operators of a PLMN 105b serving the geographic area where the subscriber 105b is located (now referred to as the Visited PLMN—V-PLMN) permit the subscriber to use the resources and infrastructure of the V-PLMN 105b, as if it were their home PLMN 105a. In this manner, roaming is supported.

However, because the MSC/VLR 120b in the V-PLMN 105b is operated by a different party and is not associated with the IPs 145 within the PLMN 105a to which the subscriber subscribes (now referred to as the Home PLMN—H-PLMN), it is unlikely that the MSC/VLR 120b would be able to translate an abbreviated number received from the now roaming mobile station 135 into the directory phone number to complete a call to the IP. Instead, the subscriber themselves must dial the directory phone number to access a call to the voice mail center. The foregoing is particularly cumbersome if the subscriber is in a different country where an international dialing prefix and a country code must be dialed in addition to the directory phone number.

Additionally, because the calling party number is not necessary to complete a connection, some V-PLMNs 105b do not include the calling party number in the packet of information that is sent to the called party for roaming subscribers. As a result, a roaming subscriber accessing services from an IP 145 is unable to take advantage of automatic identification. Therefore, even where the subscriber uses their MS 135 to access the IP 145, the subscriber must still go through the identification procedure to access the services.

To alleviate the foregoing problems for a subscriber at MS 135 who, for example, is roaming in the V-PLMN 105b and seeks to access an IP 145, the present invention proposes the addition of a data structure in the SCP 140 which cross-indexes a list of abbreviated numbers to a corresponding list of call routing instructions which direct the call to the correct MSC/VLR 120a in the correct H-PLMN 105a. When an abbreviated number for a particular IP 145 is received by the MSC/VLR 120b in the V-PLMN 105b from the roaming MS 135, subscribing to H-PLMN 105a, the SSP 121b queries the SCP 140 using the abbreviated number received from MS 135. The SCP 140 responds by transmitting the call routing instructions to the SSP 121b. The MSC/VLR 120b then uses the call routing instructions from the SCP 140 to route the phone call to the proper H-PLMN 105a and MSC/VLR 120a serving the IP 145.

When the SCP 140 is queried by the SSP 121b of the V-PLMN 105b, the SSP 121b transmits the abbreviated number dialed from MS 135 and the calling party number of the call to the SCP 140, which records both in a register. When the phone call is routed to MSC/VLR 120a, SSP 121a can query the SCP 140 for the calling party number and the abbreviated number. The SCP 140 responds by transmitting the calling party number and the abbreviated number stored in the register to the SSP 121a. The calling party number can then be inserted into a packet which is sent to the IP 145, when the MSC/VLR 120a routes the phone call to the IP 145, using the abbreviate number.

Figure 2:
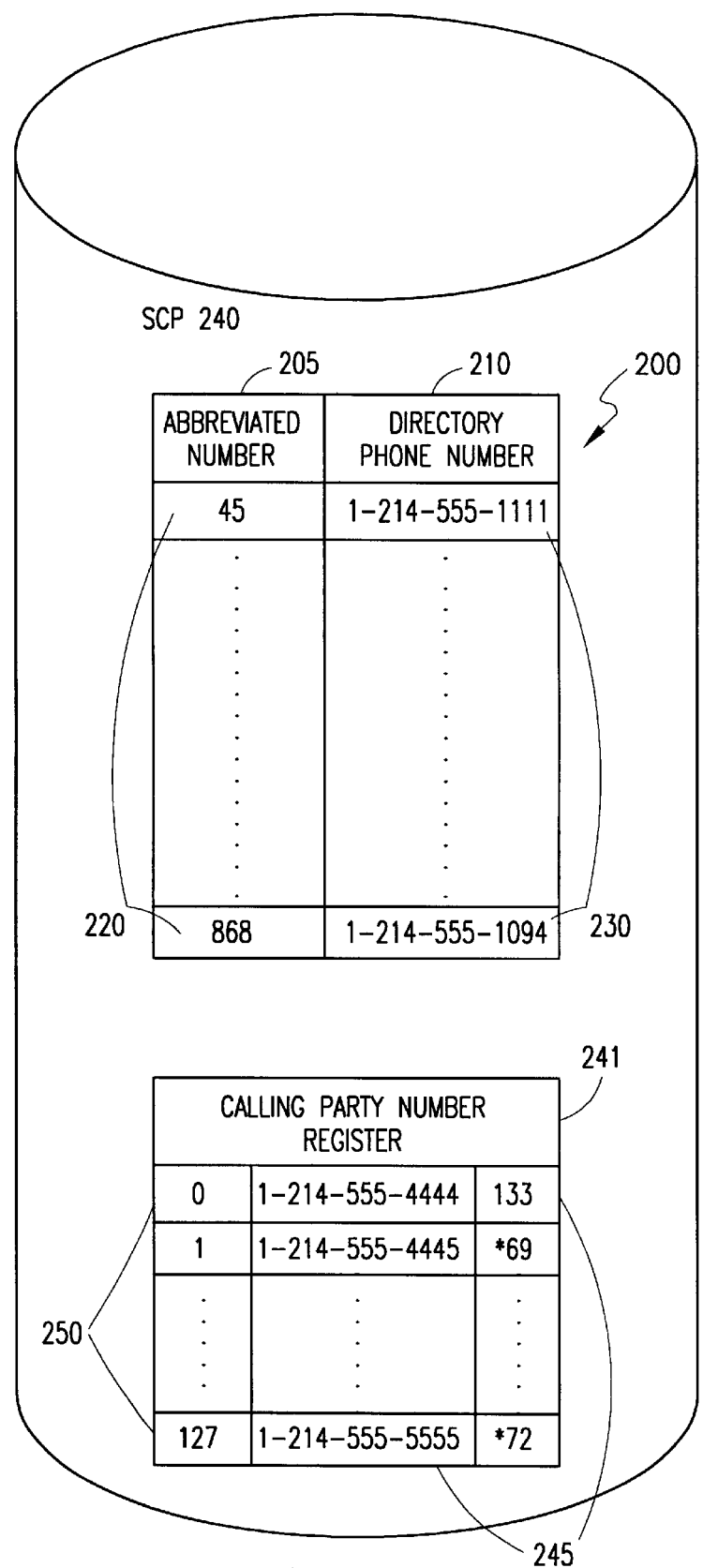
FIG. 2 is a block diagram of an exemplary Service Control Point (SCP) in accordance with the present invention.

Referring now to FIG. 2, there is illustrated a block diagram of an exemplary SCP 240 in accordance with the present invention. The SCP 240 comprises a data structure, therein generally designated by the reference numeral 200, for cross-indexing abbreviated numbers 220 associated with IPs 145, as shown in FIG. 1, in an abbreviated number field 205 to corresponding routing instructions 230 in a call routing field 210, and a calling party number register 241 for storing the calling party numbers and the abbreviated numbers. The data structure 200 includes any number of abbreviated numbers 220 cross-indexed with the aforementioned call routing instructions 230. The calling party number register 241 includes any number of calling party number storage locations 245 for storing an individual calling party number as well as an abbreviated number dialed from the calling party number. Each calling party number storage location 245 is associated with a unique index 250 which identifies the particular calling party number storage location 245.

The SCP 240 can be queried by an SSP 121, e.g. 121b, to determine the call routing instructions 230 corresponding to a given abbreviated number. The SCP 240 responds by storing the calling party number and the abbreviated number in a calling party number storage location 245 in the calling party number register 241, looking up the abbreviated number 220 in the data structure 200, and retrieving the routing instructions 230, therefrom. The call routing instructions are appended with the index 250 corresponding to the calling party number storage location 245 where the calling party number and the abbreviated number were stored, and an identification number identifying the SCP 140 (SCPid). The SCPid tells the terminating SSP 121, e.g. 121a, which SCP 140 to query while the index identifies the particular calling party number storage location 245 where the calling party number and the abbreviated number are stored.

Those skilled in the art will recognize that the signal transfers occurring during the aforementioned SCP 140 queries can be transmitted over any of several well known signal links. The signal link over which the signal transfers occur can comprise, for example, a T-1 line, the Internet, or a wireless air interface.

By performing the aforementioned database query, an MSC/VLR 120b in a V-PLMN 105b can successfully route a request to the MSC/VLR 120a serving the particular IP 145 using an abbreviated number from a mobile station 135 subscribing to H-PLMN 105a. Additionally, the SCPid, as well as the index 250 are included with the directory phone number in a packet which is sent by the MSC/VLR 120b to the MSC/VLR 120a serving IP 145. The MSC/VLR 120a then extracts the index 250 and the number identifying the SCP 140. The terminating SSP 121, e.g. 121a, queries the SCP 140 identified by SCPid. Using the index 250, the SCP 140 retrieves the calling party number number and the abbreviated number dialed by MS 135 from the calling party number register 240 and transmits them to the SSP 121a. The MSC/VLR 120a serving the IP 145 inserts the calling party number in an information packet which is transmitted while routing the phone call to IP 145 using the abbreviated number.

Figure 3:
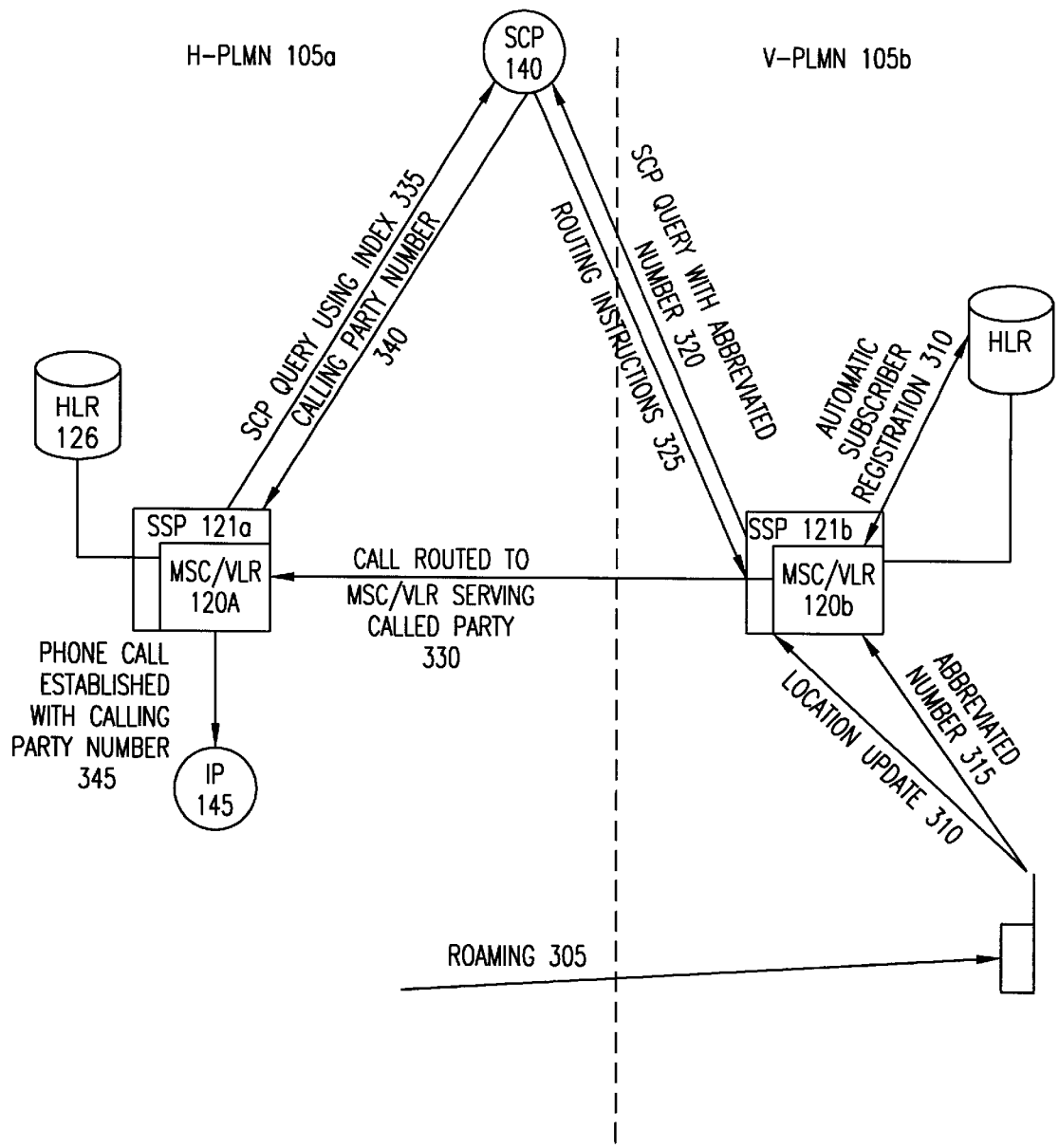
FIG. 3 is a signal flow diagram of a telecommunications system providing the calling party number for an outgoing call from a roaming mobile subscriber, in accordance with the principals of the present invention.

Referring now to FIG. 3, there is illustrated a signal flow diagram of the V-PLMN 105b routing a request for service or a phone call from the MS 135 using an abbreviated number. At initial step 305, for example, the MS 135 moves from the home geographic area of H-PLMN 105a to the geographic area of V-PLMN 105b. As is understood in the art, the MS 135 routinely transmits location update signals at regular time intervals. At step 310, the location update signal is detected by the V-PLMN 105b, triggering an automatic roaming subscriber registration in the V-PLMN 105b in a manner well known in the art. At step 315, the subscriber at MS 135 requests access to the IP 145 by dialing an abbreviated number, as is customary when within the H-PLMN 105a. The abbreviated number is received by the MSC/VLR 120b, which is currently serving the roaming MS 135 in the V-PLMN 105b. The MSC/VLR 120b examines the transmitted request and detects (1) that an abbreviated number has been received, and (2) that the subscriber at MS 135 is a roaming mobile subscriber. Therefore, in order for the MSC/VLR 120b to complete the request to access an IP 145, the MSC/VLR 120b must ascertain the routing instructions corresponding to the abbreviated number dialed by the subscriber.

To ascertain the corresponding routing instructions for the abbreviated number received from MS 135, the SSP 121b queries the SCP 140 using the abbreviated number (step 320). The SCP 140 responds by looking up the abbreviated number among the abbreviated numbers 220 stored in data structure 200 and retrieving the corresponding routing instructions 230 therefrom. The SCP 140 also stores the calling party number and the abbreviated number in a calling party number storage location 245 of the calling party number register 240. The routing instructions corresponding to the abbreviated number received by the MSC/VLR 120b from the MS 135 are retrieved and appended with the index 250 of the calling party number storage location 245, as well as the SCPid identifying the SCP 140b. The foregoing are then transmitted to SSP 121b. (step 325). The MSC/VLR 120b can then use the routing instructions to route the phone call to the MSC/VLR 120a serving IP 145. (step 330). Concurrent with routing the phone call to MSC/VLR 120a, MSC/VLR 120b sends a packet of information which includes the index 250 and the SCPid identifying SCP 140b. The MSC/VLR 120a examines the SCPid to determine that SCP 140b is storing the calling party number and the abbreviated number dialed from MS 135. The SSP 121a then queries SCP 140b using the index 250 (step 335). The SCP 140 retrieves the calling party number and the abbreviated number stored in the calling party number storage location 245 corresponding to the index 250 received from the SSP 121a. The calling party number and the abbreviated number are then transmitted from the SCP 140 to the SSP 121a(step 340). The MSC/VLR 120a then uses the abbreviated number to identify the particular IP 145 to route the phone call to. The calling party number is inserted into a packet of information and the packet is transmitted to the IP 145 while routing the phone call to IP 145 (step 345). When IP 145 receives the packet from MSC/VLR 120a, the calling party number is included therein. The IP 145 can then use the calling party number to automatically identify the subscriber.

Although the invention has been described with a certain degree of particularity, it should be recognized that elements thereof may be altered by persons skilled in the art without departing from the spirit and scope of the invention. For example, although the described embodiments illustrated abbreviated numbers and directory phone numbers referring to Intelligent Peripherals, it is noted that the present invention is not limited to Intelligent Peripherals and, indeed, in alternative embodiments, the abbreviated numbers and the directory phone numbers might not refer to Intelligent Peripherals. Therefore, the invention is limited only by the following claims and their equivalents.

What is claimed is:

1. A method for providing a calling party number to a called party, said calling party number being associated with a roaming mobile station in a visited public land mobile network (V-PLMN) subscribing to a home public land mobile network (H-PLMN), said method comprising the steps of:

receiving, at said V-PLMN, a request from said roaming mobile station to establish a call to said called party;

transmitting, from said V-PLMN, said calling party number associated with said roaming mobile station to a service control point (SCP);

storing said calling party number at said service control point (SCP);

routing the call without the calling party number from the V-PLMN to a switching point serving the called party;

querying the SCP, by the serving switching point, for the calling party number;

transmitting said calling party number from said SCP to the switching point serving said called party in response to said querying step;

delivering the call by the serving switching point to the called party; and forwarding said calling party number from the serving switching point to said called party.

2. The method of claim 1, wherein step of receiving said request further comprises the step of:

receiving said request at a mobile switching center/visitor location register (MSC/VLR) within said V-PLMN.

3. The method of claim 1, further comprising the step of detecting, by said V-PLMN, that said roaming mobile station subscribes to said H-PLMN.

4. The method of claim 3, wherein said step of transmitting said calling party number is responsive to detecting said roaming mobile station subscribes to said H-PLMN during said detecting step.

5. The method of claim 1, wherein said step of storing said calling party number further comprises the step of:

storing said calling party number in a calling party number storage location associated with an index.

6. The method of claim 5, further comprising, after said step of transmitting said calling party number from said V-PLMN to said SCP, the steps of:

transmitting from said SCP to said V-PLMN, said index associated with said calling party number storage location; and transmitting said index from said V-PLMN to said switching point serving said called party.

7. The method of claim 6, wherein said step of querying the SCP, by the serving switching point, for the calling party number further comprises the step of:

transmitting said index from said switching point serving said called party to said SCP, said index identifying the location of the stored calling party number.

8. The method of claim 6, wherein said step of transmitting from said SCP to said V-PLMN, said index associated with said calling party number storage location further comprises the step of:

transmitting an identification number from said SCP to said V-PLMN, said identification number identifying said SCP, wherein said step of transmitting said index from said V-PLMN to said switching point serving said called party comprises transmitting said index and said identification number.

9. The method according to claim 1, wherein said called party is an Intelligent Peripheral.

10. The method according to claim 9, wherein said step of transmitting the calling party number from the V-PLMN to said SCP further comprises transmitting the calling party number and an abbreviation number associated with the Intelligent peripheral providing a service, wherein said step of storing the calling party number further comprises storing the calling party number and the abbreviated number, wherein said step of transmitting said calling party number from said SCP to the switching point serving the Intelligent Peripheral further comprises transmitting the calling party number and the abbreviation number, and wherein said step of delivering the call comprises delivering the call to the Intelligent Peripheral associated with the abbreviated number.

11. The method according to claim 10, wherein said step of storing the calling party number further comprises the step of:

storing the calling party number and the abbreviated number in a storage location associated with an index in the SCP.

12. The method according to claim 11, further comprising the step of:

transmitting the index from the V-PLMN to the switching point, wherein said step of querying further comprises sending the index from the switching point to the SCP to locate the calling party number and the abbreviated number.

13. The method according to claim 9, further comprising enabling a service to the roaming mobile station provided by the Intelligent Peripheral requiring identification, wherein the service is a voice mail service, a fax mail service or a customer service.

14. The method according to claim 1, further comprising, prior to the routing step, the step of:

transmitting, from the SCP, call routing instructions to the V-PLMN, wherein said step of routing the call is performed according to the call routing instructions.

15. A Service Control Point (SCP) apparatus for storing calling party numbers, said SCP apparatus comprising:

a plurality of calling party number storage locations for storing calling party numbers of roaming mobile stations and for storing abbreviation numbers associated with peripherals providing specific services to the roaming mobile stations therein;

a plurality of indices, each of said indices associated with one of said plurality of calling party number storage locations and containing one of the calling party numbers and one of the abbreviation numbers;

receiving means for receiving an index matching one of said plurality of indices;

retrieval means for retrieving, responsive to receiving said index, a calling party number and an abbreviation number from a respective one of said plurality of calling party number storage locations, wherein said index being associated with said one of said plurality of calling party number storage locations; and transmitting means for transmitting the calling party number and the abbreviated number to a service node to enable the service by the peripheral associated with the abbreviated number, said service node identifying the roaming mobile station by said calling party number.

16. The SCP apparatus of claim 15, further comprising a first receiving means for receiving said calling party numbers from a public land mobile network (PLMN).

17. A telecommunications system for providing a calling party number, said calling party number associated with a roaming mobile station subscribing to a Home Public Land Mobile Network (PLMN), said telecommunications system comprising:

a Visited PLMN, in communication with said Home PLMN, for serving said roaming mobile station, said Visited PLMN receiving, from said roaming mobile station, a request to establish a call to a called party;

a database comprising a calling party number register for storing said calling party number associated with said roaming mobile station therein;

a signal link connecting said Visited PLMN to said database, said calling party number is transmitted from said Visited PLMN to said database over said signal link; and a switching point currently serving the called party, said switching point receiving the call as transferred from said Visited PLMN, querying said database to retrieve the calling party number and delivering the call including the calling party number to the called party.

18. The telecommunications system of claim 17, wherein said database further comprises a Service Control Point (SCP).

19. The telecommunications system of claim 17, wherein said database further comprises:

a plurality of calling party number storage locations for storing calling party numbers associated with the roaming mobile stations;

a plurality of indices for identifying said plurality of calling party number storage locations, each of said plurality of indices associated with a respective one of said plurality of calling party number storage locations; and retrieval means for retrieving a calling party number from said respective one of said plurality of calling party number storage locations responsive to receiving an index from said switching point in said query operation, said index matching one of said plurality of indices.

20. The telecommunications system of claim 19, further comprising transmission means for transmitting said index from said switching point to said database.

21. A system for providing a calling party number of a roaming mobile station, said telecommunications system comprising:

an Intelligent Peripheral (IP) configured to provide a service to the roaming mobile station;

a Visited PLMN serving the roaming mobile station, said Visited PLMN receiving, from said roaming mobile station, a request to establish a call toward the IP;

a Service Control Point (SCP) comprising a database for storing calling party numbers, said SCP receiving the calling party number associated with said roaming mobile station from said Visited PLMN and storing the calling party number therein; and a Home PLMN that receives the call as transferred from said Visited PLMN, queries said SCP to retrieve the calling party number and delivers the call including the calling party number to the Intelligent Peripheral.

22. The system according to claim 21, wherein said SCP is configured to send, to the Visited PLMN, routing instructions for the call, said Visited PLMN routing the call according to the routing instructions.

23. The system according to claim 21, wherein said Intelligent Peripheral is a voice mail center, a fax mail center or a customer service center.

24. The system according to claim 21, further comprising an index associated with a location wherein the calling party number is stored within said database, said index being provided by the Visited PLMN to the Home PLMN to indicate the location of the stored calling party number within said SCP, said Home PLMN querying the SCP using said index indicative of the location of the calling party number.

25. The system according to claim 21, further comprising an abbreviation number associated with the Intelligent Peripheral providing a service, said abbreviation number being provided from the visited PLMN and stored within the SCP, said SCP sending said abbreviated number to the Home PLMN to enable the delivery of the call to said Intelligent peripheral providing the service.

* * * * *

UNITED STATES PATENT AND TRADEMARK OFFICE
CERTIFICATE OF CORRECTION

PATENT NO.    : 6,324,396 B1
DATED         : November 27, 2001
INVENTOR(S)   : Vasa et al.

It is certified that error appears in the above-identified patent and that said Letters Patent is hereby corrected as shown below:

<u>Title page,</u>
Item [75], Inventors, replace "Garland" with -- Garland, TX --
Replace "Plano" with -- Plano, TX --
Replace "Dallas, all of TX (US)" with -- Raleigh, NC --

<u>Column 2,</u>
Line 60, replace "supplement" with -- supplemented --

<u>Column 3,</u>
Line 45, replace "105aand" with -- 105a and --

<u>Column 5,</u>
Line 6, replace "105agenerally" with -- 105a generally --

Signed and Sealed this

Second Day of July, 2002

Attest:

JAMES E. ROGAN
*Attesting Officer*      *Director of the United States Patent and Trademark Office*